US006776689B2

(12) United States Patent
Eichelberger

(10) Patent No.: US 6,776,689 B2
(45) Date of Patent: Aug. 17, 2004

(54) METHOD AND APPARATUS FOR FORMING A CERAMIC CATALYST SUPPORT

(75) Inventor: Paul J. Eichelberger, Mount Airy, MD (US)

(73) Assignee: Corning Incorporated, Corning, NY (US)

(*) Notice: Subject to any disclaimer, the term of this patent is extended or adjusted under 35 U.S.C. 154(b) by 187 days.

(21) Appl. No.: 09/968,971

(22) Filed: Oct. 1, 2001

(65) Prior Publication Data

US 2002/0086614 A1 Jul. 4, 2002

Related U.S. Application Data

(60) Provisional application No. 60/258,775, filed on Dec. 29, 2000.

(51) Int. Cl.[7] .................................. B24B 5/14
(52) U.S. Cl. .......................... 451/8; 451/541
(58) Field of Search .............. 451/8, 541, 36, 451/5, 65, 357, 11, 57, 285–288

(56) References Cited

U.S. PATENT DOCUMENTS

| | | | |
|---|---|---|---|
| 3,111,789 A | * 11/1963 | Harmon | 451/180 |
| 4,461,121 A | * 7/1984 | Motzer et al. | 451/5 |
| 5,487,694 A | 1/1996 | Deming | |
| 5,564,409 A | 10/1996 | Bonzo et al. | |
| 6,267,656 B1 | * 7/2001 | Shendon | 451/398 |
| 6,280,292 B1 | * 8/2001 | Sato et al. | 451/9 |
| 2002/0072303 A1 | * 6/2002 | Chern et al. | 451/22 |

FOREIGN PATENT DOCUMENTS

| | | |
|---|---|---|
| DE | 2201881 | 7/1973 |
| DE | 2428964 | 1/1976 |

OTHER PUBLICATIONS

A. Heibel et al., "A New Converter Concept Providing Improved Flow Distribution and Space Utilization", Doc. No. 1999–01–0768, Book No. SP–1409, Session: Advanced Converter Concepts (Part A&B), SAE International Congress & Exposition, Detriot, MI, USA, (Mar. 1999).

* cited by examiner

*Primary Examiner*—Lee D. Wilson
(74) *Attorney, Agent, or Firm*—Kees van der Sterre; Timothy M. Schaeberle

(57) ABSTRACT

A grinding assembly for shaping an inlet or outlet face of a ceramic catalyst substrate provides for forming a predetermined face on the substrate, the substrate having a circular or non-circular cross-sectional profile. A grinding head is rotated about a grinding axis, and the grinding axis is selectively translated about an orbital path.

18 Claims, 8 Drawing Sheets

FIGURE 4
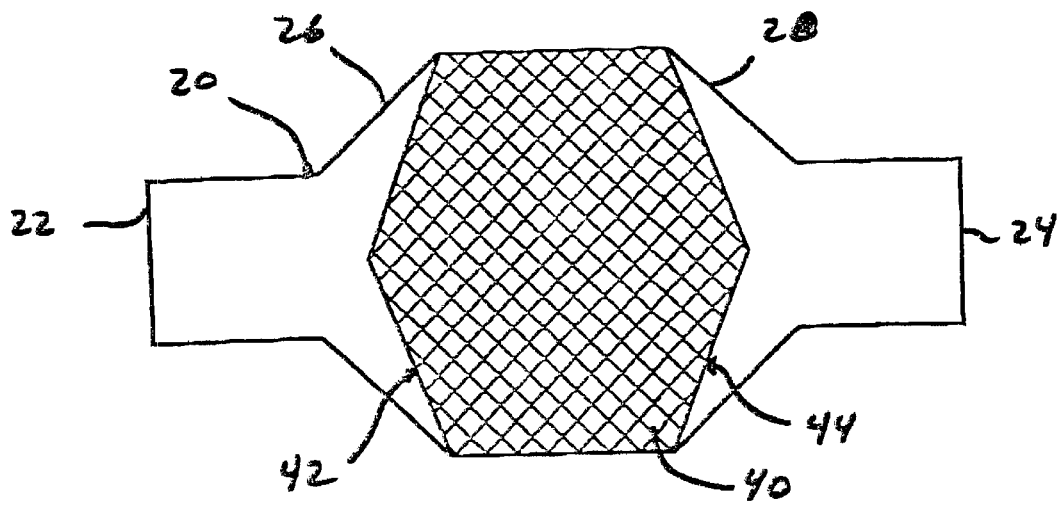
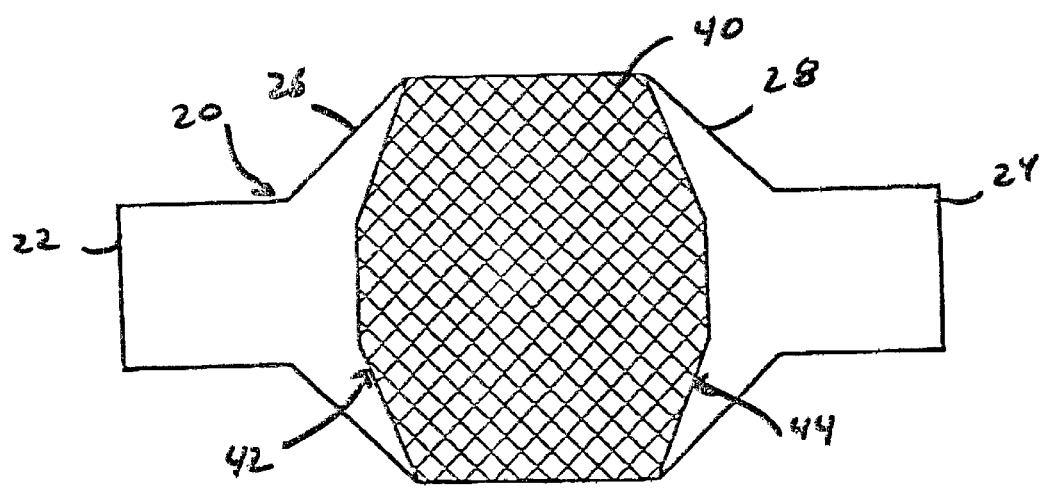
FIGURE 5

FIGURE 12
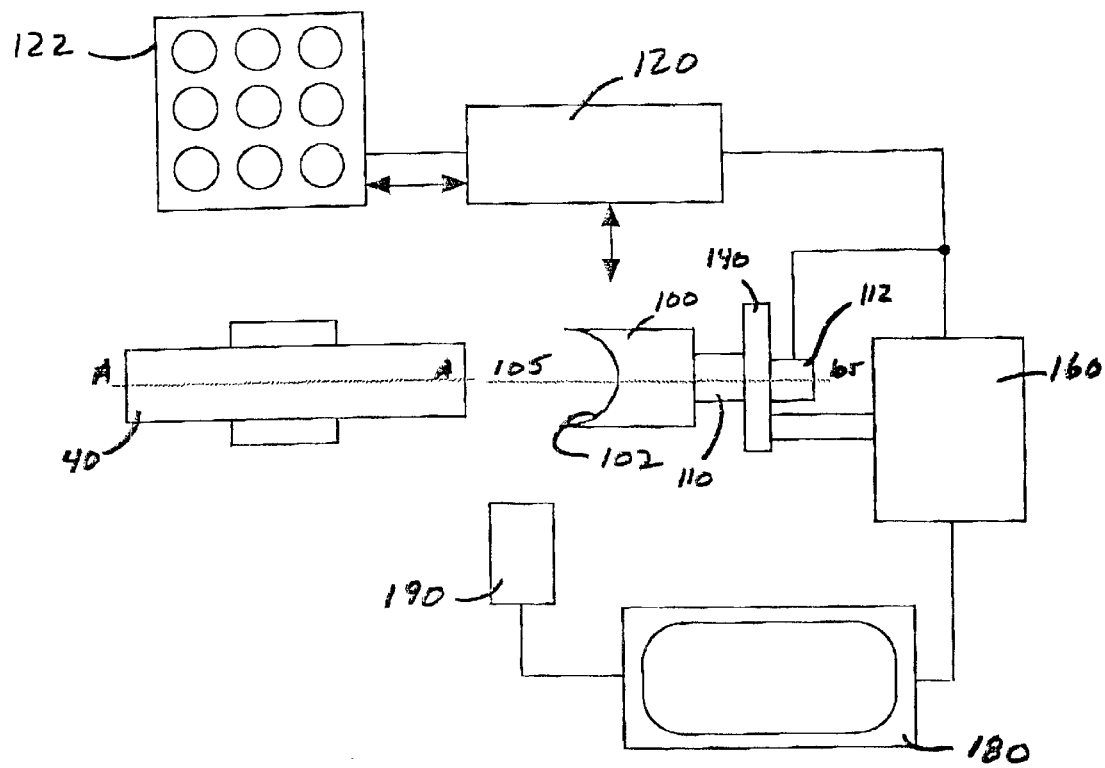
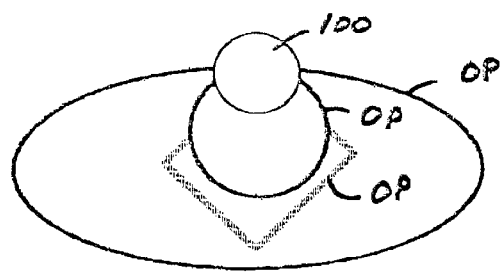
FIGURE 13

FIGURE 14
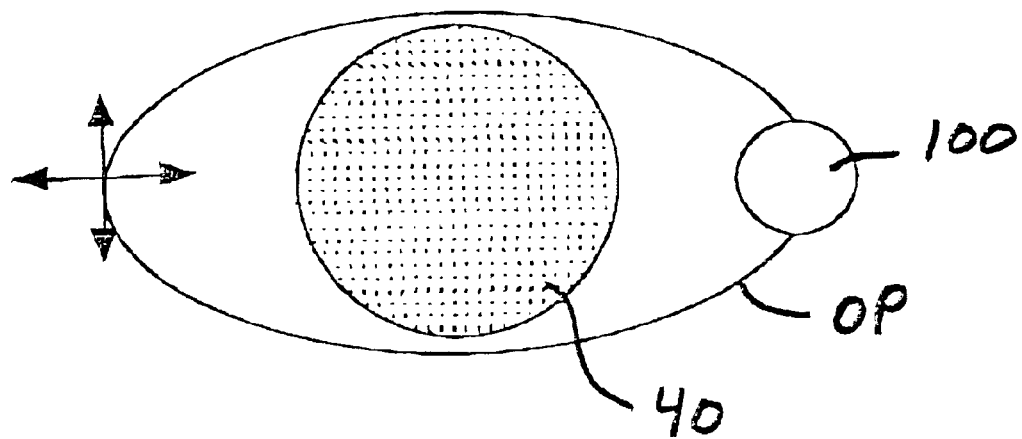
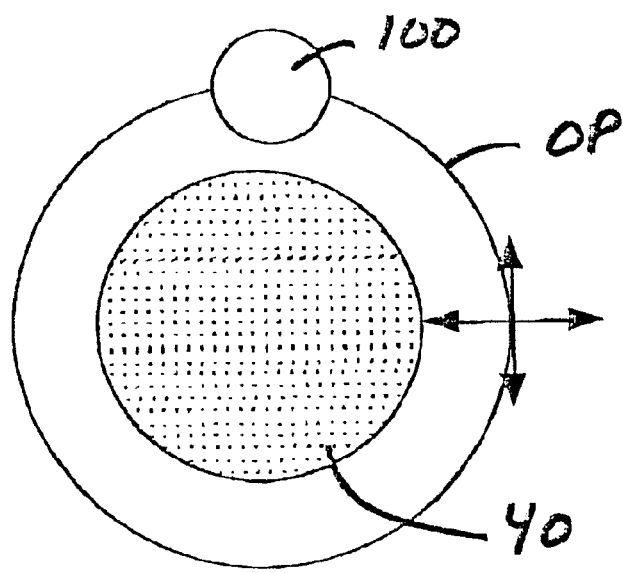
FIGURE 15

METHOD AND APPARATUS FOR FORMING A CERAMIC CATALYST SUPPORT

This application claims the benefit of U.S. Provisional Application No. 60/258,775, filed Dec. 29, 2000, entitled "Method and Apparatus for Forming an Inlet and Outlet Face of a Ceramic Catalyst", by Paul J. Eichelberger.

BACKGROUND OF THE INVENTION

The present invention relates to catalyst supports in catalytic converters for purifying exhaust gases, and more particularly to shaping at least one of an inlet face and an outlet face of a ceramic catalyst support, wherein the inlet and outlet faces can include a conical or frusto-conical surface.

Early exhaust gas purifying systems included a cylindrically shaped catalyst coated honeycomb substrate having a flat inlet face. Although this conventional system effectively converted pollutants into non-toxic gases, the design tended to exhibit non-uniform flow distribution. Specifically, the high velocity exhaust gases which were emitted from a relatively small diameter exhaust pipe of an internal combustion engine did not significantly diffuse when passing from the exhaust pipe into the larger diameter casing in which the catalyst substrate was located. As a result, a larger portion of the high velocity exhaust gas tended to flow through the center of the honeycomb structure than through the peripheral portion. As a result of this non-uniform flow distribution of exhaust gases through the center, these catalytic converter systems exhibited a loss of conversion efficiency, as well as deactivation of the converter in the region of highest flow velocity. In addition, the non-uniform flow distribution tended to result in a higher pressure drop across the catalyst structure, which in turn results in decreased engine performance.

A variety of attempts have been made to increase the efficiency of the catalytic converter structure. These attempts have included altering the expansion angle between the inlet and the casing. However, the resulting flow still creates non-uniform flow distribution and less than optimum conversion efficiency.

Therefore, a need exists for a catalyst substrate that can enhance uniform gas flow through the substrate and hence the catalytic converter. The need also exists for a catalyst substrate that can provide greater surface area without requiring increased casing volume. The further need exists for forming a catalyst substrate by an economically acceptable process, wherein the resulting substrate can be formed to match the profile of a desired casing or can. The need further exists for a method and apparatus for manufacturing substrates that can have a shaped inlet and outlet face.

SUMMARY OF THE INVENTION

The present invention includes an apparatus for shaping a face of a catalyst substrate. The face can be an inlet face or an outlet face, and can be shaped to include a conical or frusto-conical surface. The present system provides for the formation of a monolithic ceramic catalyst substrate having at least one of the inlet face or the outlet face defined by a conical or frusto-conical surface. The present invention can shape the face of a green, dried, calcined or fired ceramic substrate. By shaping at least one of the inlet or outlet faces, a greater volume of substrate can be enclosed in industry accepted casing volumes. Further, the present apparatus can be employed to shape a substrate that can be any of a variety of materials to support a broad spectrum of catalysts.

The apparatus includes a grinding head rotatable about a grinding axis, wherein the grinding axis is translatable about an orbital path. The orbital path can be selectively controlled in response to the cross sectional profile of the given substrate to provide a shaped face of the substrate. The apparatus can include a sensing station and a controller to allow for customization of the face. Thus, the present invention can form a face having a curvilinear surface as well as a face having a faceted surface.

BRIEF DESCRIPTION OF THE DRAWINGS

FIG. 4 is a side elevational view of an inline casing and a catalyst substrate having a conical inlet face and conical outlet face.

FIG. 5 is a side elevational view of an inline casing and a catalyst substrate having a frustoconical inlet and frustoconical outlet face.

FIG. 12 is a schematic representation of an apparatus for shaping/contouring the catalyst substrate.

FIG. 13 is a schematic representation of a plurality of orbital paths.

FIG. 14 is a schematic representation of a non-circular orbit with respect to a cross sectional profile of the substrate to be shaped.

FIG. 15 is a schematic representation of a circular orbit with respect to a cross sectional profile of the substrate to be shaped.

DETAILED DESCRIPTION

Figure 1:
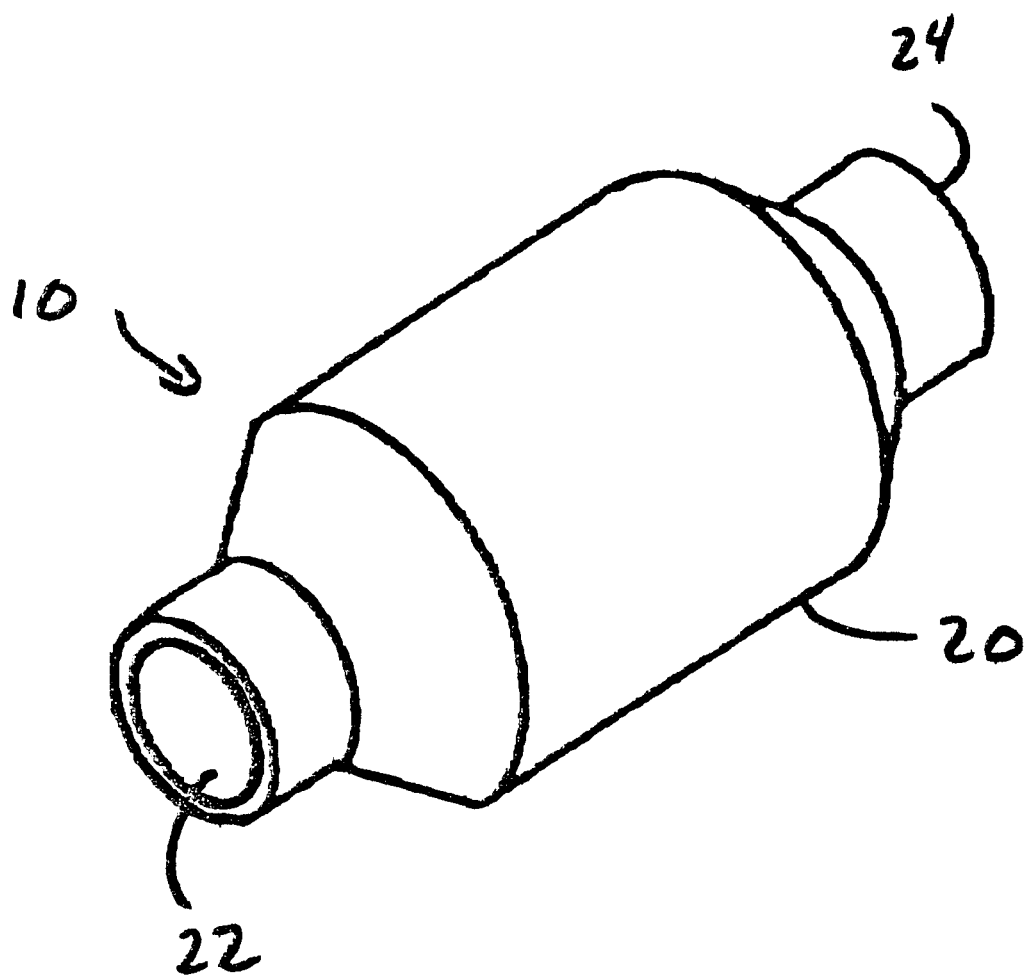
FIG. 1 is a perspective view of a casing for operably retaining a catalyst substrate.
Figure 2:
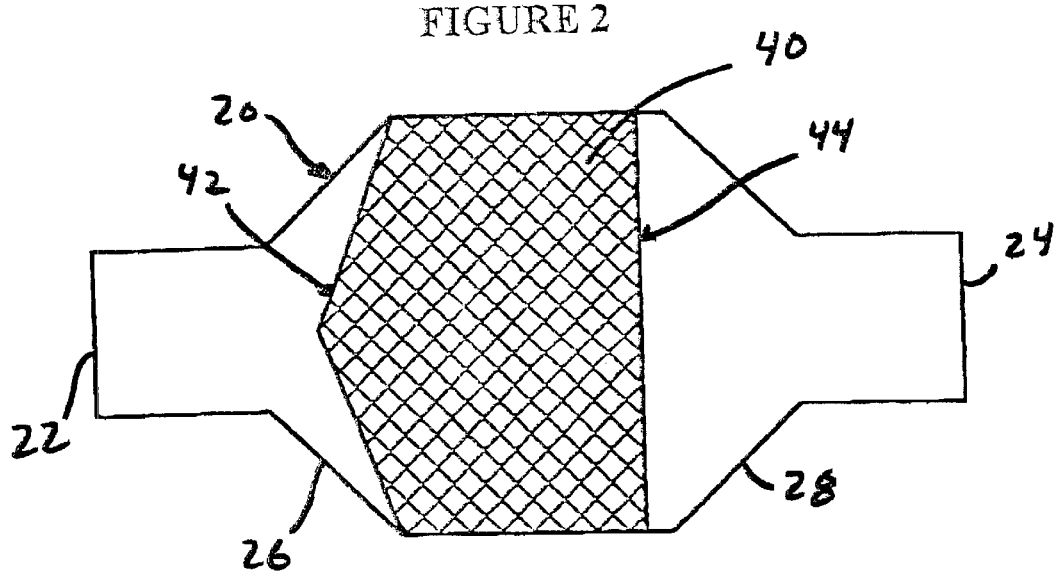
FIG. 2 is a side elevational cross-sectional view of a casing and a catalyst substrate having a conical shaped inlet face.
Figure 3:
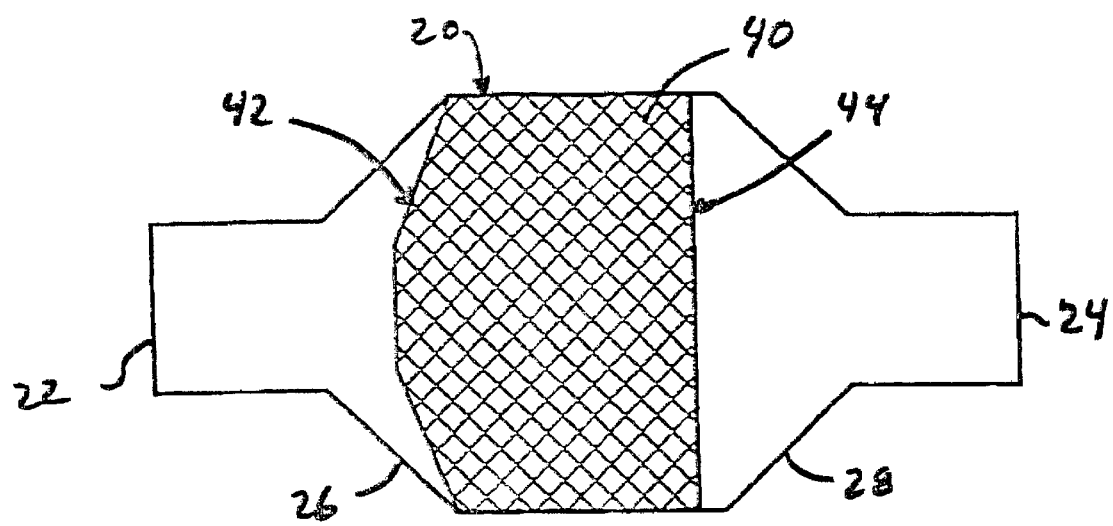
FIG. 3 is a side elevational view of an inline casing and a catalyst substrate having a frustoconical inlet face.
Figure 6:
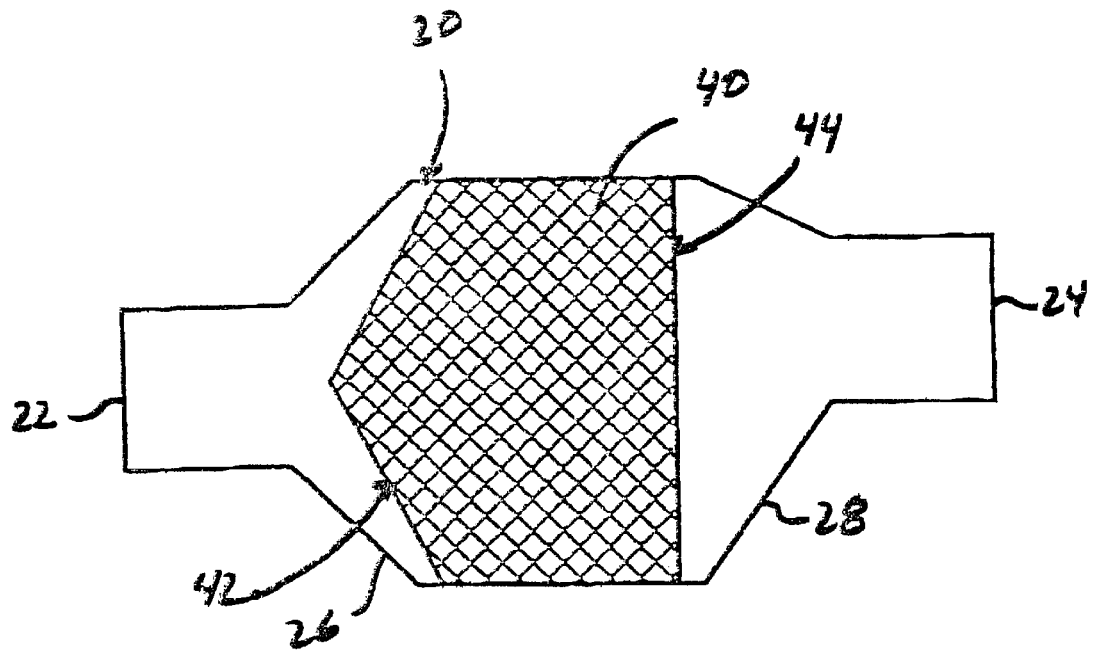
FIG. 6 is a side elevational view of an offset casing and a catalyst support having a concentric conical inlet face.
Figure 7:
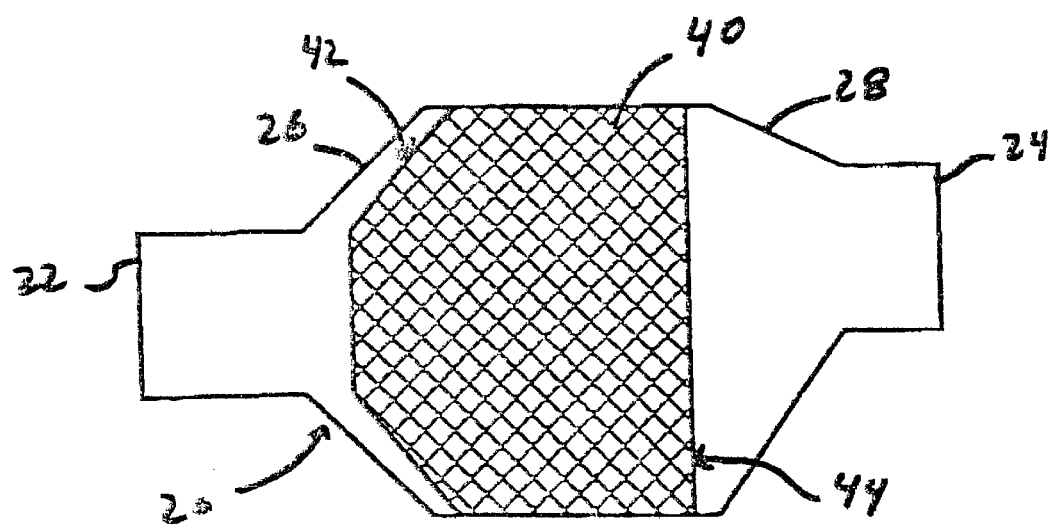
FIG. 7 is a side elevational view of an offset casing and a catalyst support having a frustoconical concentric inlet face.
Figure 8:
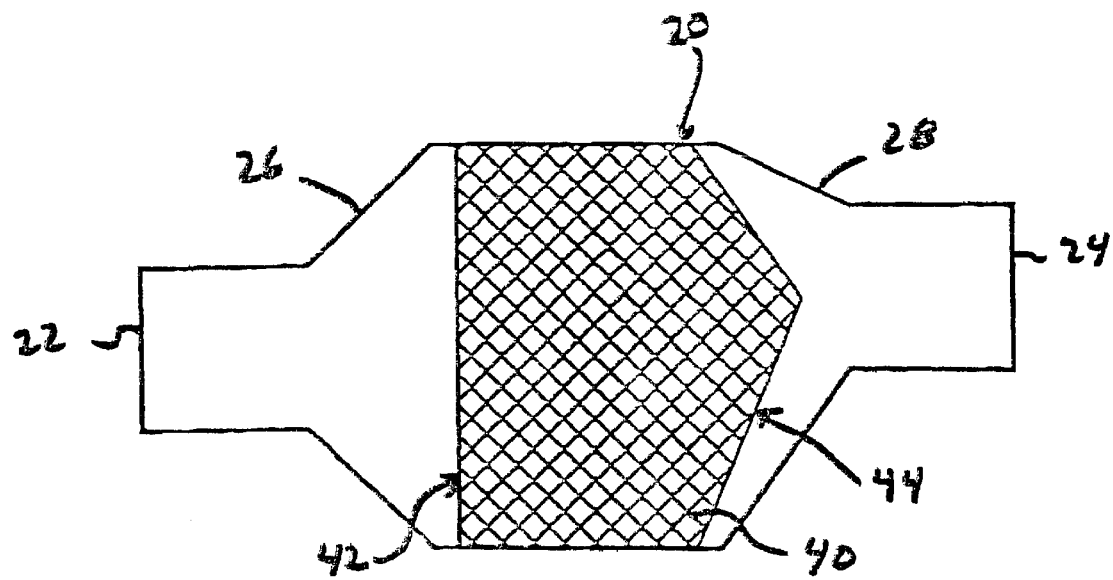
FIG. 8 is a side elevational view of an offset casing and a catalyst support having an offset conical outlet face.
Figure 9:
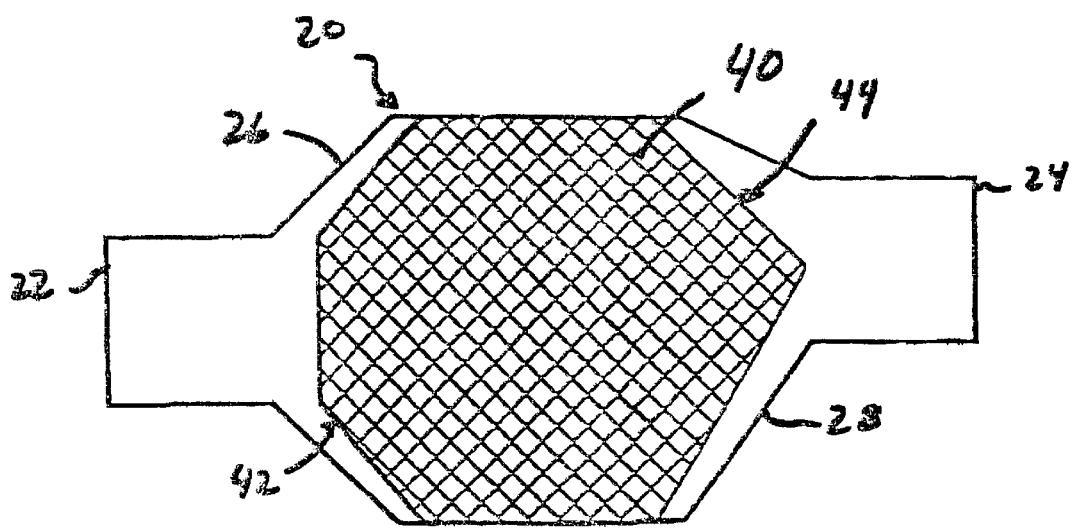
FIG. 9 is a side elevational view of an offset casing and a catalyst support having a concentric frustoconical inlet face and an offset conical outlet face.

Referring to FIG. 1, a catalytic converter 10 for purifying exhaust gases from an internal combustion engine is shown. The catalytic converter 10 includes a casing or can 20 enclosing a catalyst substrate 40 seen in (FIGS. 2–9).

The casing 20 is constructed to operably retain and locate the catalyst substrate 40 relative to a flow of exhaust gas. Depending upon the intended operating parameters the casing 20 may have a circular, non-circular or faceted cross sectional profile. A typical non-circular cross sectional profile of the casing is oval.

The can 20 is formed of a material capable of resisting under-car salt, temperature and corrosion; such as metal and particularly ferritic stainless steels including grades SS-409, SS-439, and more recently SS-441 are generally preferred. The choice of material depends on the type of gas, the maximum temperature, flow rates and the like. The casing 20 has an inlet port 22 and an outlet port 24. Gas introduced through inlet port 22 flows through the substrate 40 and out through outlet port 24.

Typically, the flow path upstream of the casing 20 is defined by a tube or pipe having a given cross sectional area. The casing 20 has a cross sectional area that is substantially greater than the cross sectional area of the upstream flow path. The casing 20 includes an inlet taper 26 or flare from the cross sectional area of the inlet pipe to the cross sectional area of the casing. Similarly, the casing 20 includes an outlet taper 28 from the cross sectional area of the casing to the cross sectional area of the outlet pipe. The inlet port 22 and the outlet port 24 of the casing 20 may lie along a common axis. Alternatively, as seen in FIGS. 6–9, the inlet port 22 and outlet port 24 may be offset.

The substrate 40 is typically supported in the casing 20 by a ceramic fiber mat or wire mesh, which encircles the substrate and functions as a shock absorber. In a preferred construction, the mat is intumescent. The mat has a width substantially equal to the length of the substrate 40, and is interposed between the substrate and the casing 20 so as to be wound around the substrate. The mat set by proper heating, presses the outer periphery of the substrate thereby fixing it against a drag caused by the gas flow. Flanges or ribs, may be optionally included in the catalytic converter design, and protrude from the inner periphery of the casing 20, whereby the mat is prevented from being longitudinally dislocated with respect to the casing by the drag from the gas flow or associated vibrational accelerations.

As installed in the casing 20, the substrate 40 is a catalyst substrate. However, the present invention can form a ceramic substrate that is catalytic or non-catalytic. It is understood that while the present description is set forth in terms of a catalyst substrate, this does not limit the applicability of the invention. The substrate 40 can have any of a variety of cross sectional profiles including, but not limited to cylindrical, round or faceted. Typically, the substrate 40 is generally cylindrical having either a non-round (oval in this embodiment) cross section or a circular cross section. In a preferred construction, the substrate has an aspect ratio of greater than approximately 1.05.

The catalyst substrate 40 functions as the catalyst structure or carrier. In a preferred embodiment, the catalyst substrate 40 is a honeycomb substrate, which is an extruded body. The substrate 40 can be any material suitable for high temperature application such as certain metals, metal alloys, ceramics, glass-ceramics, glass, high surface area temperature stable oxides and combinations of these materials. Examples of useful substrate materials include, cordierite, mullite, clay, talc, zircon, zirconia, spinel alumina silica borides, lithium aluminosilicates, aluminasilica, feldspar titania, fused silica, nitrides, carbides and mixtures of these. Useful metals for the substrate 40 include, substrates formed of iron group metals such as Fe—Al, Fe—Cr—Al alloys, stainless steel, and Fe-nickel alloys. A preferred material for the substrate 40 is an extruded ceramic material such as cordierite.

Suitable catalysts for use on the catalyst substrate 40 are any of those catalysts which are capable not only of oxidizing hydrocarbons to form water and carbon dioxide, but also at converting carbon monoxide and $NO_x$ in the exhaust stream to innocuous products. Such catalysts well known in the art and commonly used in automotive catalytic converters, including noble metal oxidation catalysts such as platinum, rhodium, and palladium as well as mixtures of these. Preferably, a three-way catalysts individually capable of converting harmful oxides of nitrogen, carbon monoxide and hydrocarbons to harmless by-products are preferred. Examples of such catalysts include platinum/palladium/rhodium on gamma-alumina with rare earth oxides (i.e. ceria) or platinum on ceria-alumina combined with rhodium on zirconia. These catalysts may be incorporated into the honeycomb substrate 40 by known methods. The term substrate 40 or catalyst substrate is intended to encompass substrates formed of catalytic materials as well as substrates that support a catalyst.

Referring to FIGS. 2–9, the catalyst substrate 40 of the present invention has an inlet face 42 and an outlet face 44. The inlet face 42 defines the first surface of the substrate 40 to contact a flow and the outlet face 44 defines the last surface of the substrate to the contact the flow.

Figure 10:
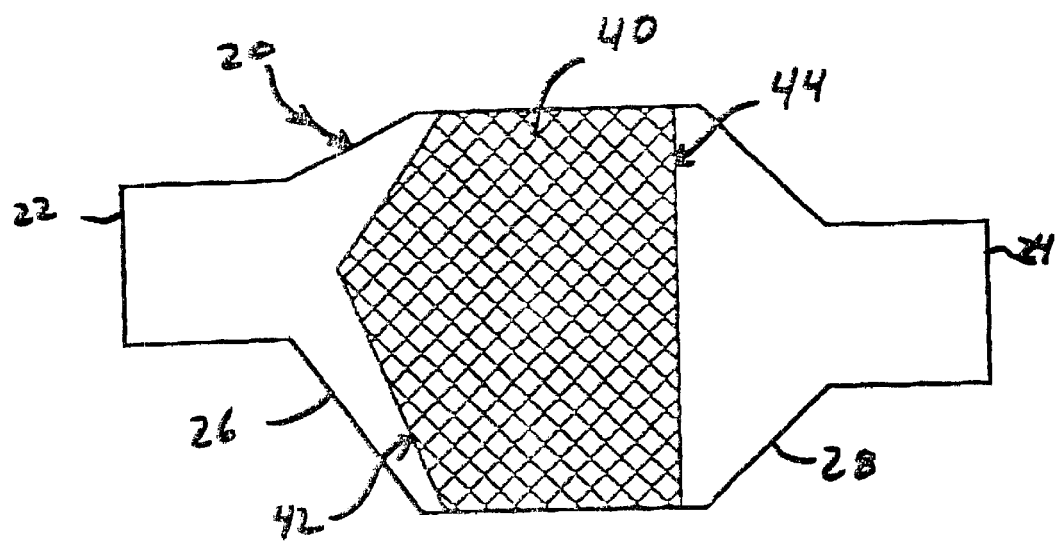
FIG. 10 is a side elevational view of an offset casing with a catalyst support having an offset conical inlet face.
Figure 11:
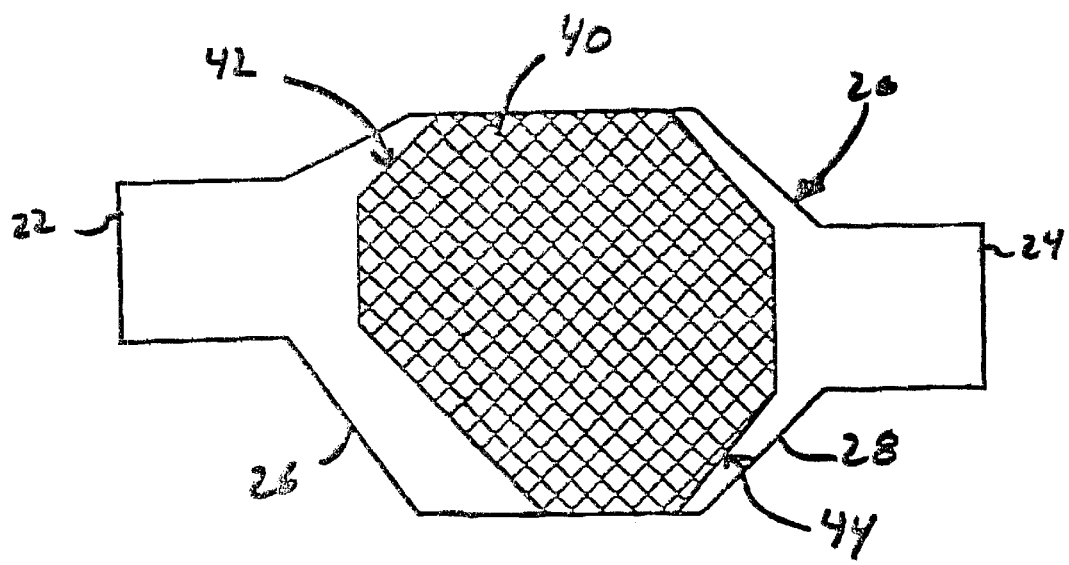
FIG. 11 is a side elevation view of an offset casing with a catalyst support having an offset frustoconical inlet face.

The present invention provides a catalyst substrate 40 having shaped inlet or outlet faces. The shaped faces can be employed to permit the substrate to occupy at least a portion of the casing 20 volume defined by the inlet taper 26 and the outlet taper 28. Typically, the shaped inlet face 42 and outlet face 44 define a conical or frusto-conical surface. The inlet face 42 can be concentric (FIGS. 2, 7 and 9) or offset from the longitudinal axis of the substrate 40 (FIGS. 10–11). Similarly, the outlet face 44 can be concentric with (FIGS. 4, 5, 8 and 9) or offset from (FIGS. 8–9) the longitudinal axis of the substrate 40. Combinations of the offset and concentric (inlet and outlet) faces are also contemplated. In addition, the relevant face may be concentric with or offset from the adjacent port in the casing 20.

It is understood the term conical defines those surfaces of a solid bounded by a base plane and formed by a line segment joining every point of the boundary of the base to a common vertex. The common vertex may lie on the longitudinal axis of the substrate 40 or be spaced from the longitudinal axis. The term frusto-conical includes those surfaces of a cone-shaped solid next to the base that is formed by cutting off the top by a plane parallel to the base. The shaped face can be defined by a light circular cone, general cone, as well as ellipsoid, spheroid, paraboloid and hyperboloid. In addition, the shaped face can include a faceted surface such as a polyhedron, including a pyramid, a prism or a wedge, as well as frustums of such shape. For purposes of description, each of these surfaces are encompassed by the term "shaped."

Referring to FIG. 12, an apparatus 80 for shaping the inlet face or the outlet face of the substrate 40 is shown. The apparatus 80 includes a grinding head 100, an orbital mount 140 and an orbital drive 160. In certain configurations, the shaping system further includes a supply array exchange 170 a controller 180 and a sensing station 190.

The grinding head 100 includes a grinding surface 102 for contacting a portion of the substrate 40 to selectively remove material from the substrate. The grinding head 100 is rotated about a grinding axis 105. The grinding head 100 is releaseably retained in a chuck 110 for rotation about the grinding axis 105. Preferably, the chuck 110 can be disposed to locate the grinding axis 105 parallel to the longitudinal axis A—A or intersecting the longitudinal axis.

The grinding surface 102 can have any of a variety of configurations including, but not limited to, discs, wheels, pads, bits, plates or cups. Further, each of these configurations may have a variety of constructions. For example, the cup configuration of the grinding surface 102 includes a concave recess sized to receive a portion of the substrate. The concave recess may be conical, frustoconical or curvilinear such as hemispherical.

The particular material of the grinding head 100 is at least partially determined by the material of the substrate 40 to be shaped. Similarly, the rotational speed of the grinding head 100 is also dictated by intended operating parameters.

Depending upon the intended operating parameters, the grinding head 100 is rotated about the grinding axis 105 by a grinding drive 112. Preferably, the grinding drive 112 is controlled to provide a given rotation rate.

While the grinding head 100 is described in terms of a single head, it is understood an array 122 of interchangeable grinding heads can be provided. In this configuration of the system, a robotic manipulator 120 is disposed intermediate the array of grinding heads 122 and the chuck 110. The manipulator 120 is connected to the controller 180 and interchanges grinding heads 100 between the array and the chuck 110. While the robotic manipulator 120 is preferred, the grinding heads 100 may be manually selected from the array of grinding heads.

The grinding head 100 is operably connected to the orbital mount 140 for rotation about the grinding axis 105 relative to the orbital mount. That is, the grinding head 100 rotates about the grinding axis 105 relative to the orbital mount 140.

Referring to FIG. 13 the orbital mount 140 is translatable about an orbital path OP. The grinding axis 105 is thus translated about the orbital path OP. Translation of the orbital mount 140 about the orbital path OP is provided by the orbital drive 160. The orbital path OP can be varied to include a circular path as well as an oval or elliptical path. The orbital drive 160 and the orbital mount 140 are selected to permit translation about a circular orbit or a non-circular orbit, such as an oval.

The orbital drive 160 is selectively controllable to vary the translation rate about the orbital path OP as well as the configuration of the orbital path.

While the grinding head 100 can be rotated about the grinding axis 105 by the grinding drive 112, it is understood the orbital drive 160 can be employed to provide rotation of the grinding head about the grinding axis.

The controller 180 is provides an operator interface for selecting and implementing desired operating parameters of the system. The controller 180 can have any of a variety of configurations such as stand alone, modular or dedicated construction. The controller 180 can be an industry standard pc running controlling software. Alternatively, the controller 180 can be a dedicated device. A typical controller 180 is a dedicated device operably connected to the grinding drive 112 and the orbital drive 160. In those configurations of the system employing the sensing station 190, the controller 180 is operably connected to the sensing station.

The sensing station 190 is used to identify the substrate 40, so as to provide for the association with the appropriate grinding head 100 for the substrate and surface to be formed. Therefore, the sensing station 190 can be used to determine the cross-sectional profile, shape or type of the substrate 40. In addition, the sensing station 190 can be operably connected to the array of grinding heads 122 to identify a given grinding head. The sensing station 190 can include an optical scanner for reading codes such as bar codes placed on, or associated with a given portion of the substrate or grinding head. Alternatively, the optical sensor may scan the substrate 40 or the grinding head 100 to provide relevant information such as a cross-sectional profile or type.

The controller 180 is operably connected to the grinding drive 112, the orbital drive 160, the robotic manipulator 120 and the sensing station 190. The controller 180 is programmed to associate a given substrate 40 and surface to be formed with a certain set of operating parameters, including grinding head, grinding rotation rates, orbital paths and orbital translation rates.

Through the selection of the operating parameters the substrate 40 can be shaped to have a right conical face on a substrate having a non-round (oval) cross-section. Similarly, a substrate 40 having a circular cross section can be shaped to have a right conical face. However, the operating parameters can be selected to form a face defined by an offset cone. Alternatively, the parameters can be selected to form an inlet face or outlet face having a tapered configuration, wherein any cross-sectional area taken transverse to the longitudinal axis defines a concentric periphery. That is, for a substrate 40 having an oval cross section, any transverse section along the taper has an oval periphery.

While the invention has been described in connection with presently preferred embodiments thereof, those skilled in the art will recognize that many modifications and changes may be made to those embodiments without departing from the true spirit and scope of the invention, which accordingly is intended to be defined solely by the appended claims.

I claim:

1. A method of shaping a face on a ceramic catalyst substrate having a longitudinal axis, the method comprising:
   (a) rotating a grinding head about a grinding axis; and
   (b) translating the grinding axis about a non-circular orbital path relative to the ceramic catalyst substrate.

2. The method of claim 1, further comprising forming the face to have a cross sectional profile concentric with a cross sectional profile of the substrate.

3. The method of claim 1 further comprising translating the grinding axis about an oval orbital path.

4. The method of claim 1 further comprising locating the grinding axis parallel to the longitudinal axis.

5. The method of claim 1 further comprising intersecting the grinding axis and the longitudinal axis.

6. An apparatus for shaping a face of a ceramic catalyst substrate, comprising:
   (a) a grinding head rotatable about a grinding axis;
   (b) an orbital mount connected to the grinding head, the orbital mount translatable about an orbital path; and
   (c) a sensor connected to the orbital mount for detecting a characteristic of the ceramic catalyst substrate and generating a corresponding sensor signal.

7. The apparatus of claim 6, further comprising a controller connected to the sensor and the orbital mount, the controller selecting a given orbital path in response to a signal from the sensor.

8. The apparatus of claim 7, wherein the orbital path is selected to form the face having a concentric cross section with a cross section of the substrate.

9. The apparatus of claim 8, further comprising a controller connected to the sensor and a manipulator, the manipulator operably connectable to the grinding head for selectively removing the grinding head.

10. An apparatus for shaping a face of a ceramic catalyst substrate having a longitudinal axis, the apparatus comprising:
    (a) a clamp for releaseably retaining a length of the substrate;
    (b) a grinding head rotatable about a grinding axis;
    (c) an orbital mount connected to the grinding head, the orbital mount translatable about an orbital path;

(d) an orbital drive connected to the orbital mount for translating the orbital mount about the orbital path;

(e) a sensor for detecting a characteristic of the substrate and generating a sensing signal; and (f) a controller connected to the sensor and the orbital drive for controlling the orbital drive in response to the sensing signal.

11. The apparatus of claim 10, wherein the grinding axis is parallel to the longitudinal axis.

12. The apparatus of claim 10, wherein the grinding axis intersects the longitudinal axis.

13. The apparatus of claim 12, wherein the orbital path is circular.

14. The apparatus of claim 12, wherein the orbital path is non-circular.

15. The apparatus of claim 12, wherein the orbital path is oval.

16. The apparatus of claim 12, wherein the sensor is an optical sensor.

17. The apparatus of claim 12, wherein the sensor is a bar code reader.

18. The apparatus of claim 12, further comprising a robotic manipulator connected to the controller for selectively removing the grinding head.

* * * * *